Feb. 26, 1963 T. POORTER 3,079,567
WIDEBAND TRANSISTOR AMPLIFIER
Filed May 16, 1960
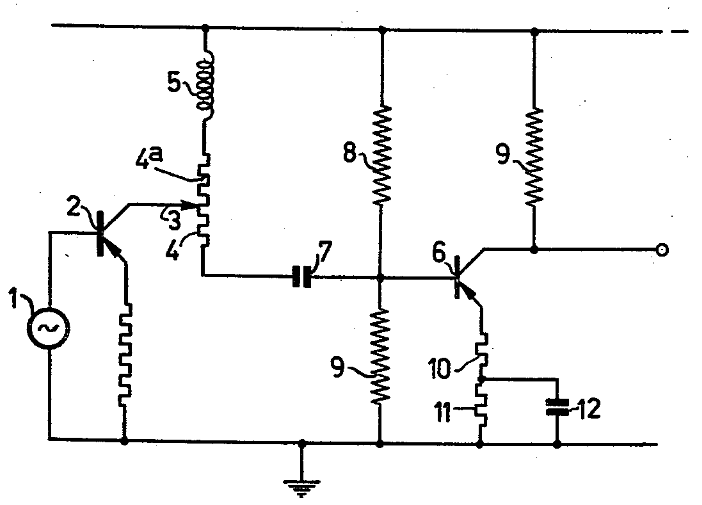
INVENTOR
TEUNIS POORTER
BY
Frank R. Trifari
AGENT

United States Patent Office 3,079,567
Patented Feb. 26, 1963

3,079,567

WIDEBAND TRANSISTOR AMPLIFIER

Teunis Poorter, Eindhoven, Netherlands, assignor to North American Philips Company, Inc., New York, N.Y., a corporation of Delaware Filed May 16, 1960, Ser. No. 29,322
Claims priority, application Germany June 4, 1959
3 Claims. (Cl. 330—21)

The invention relates to a transistor amplifier for electric signals, in particular to an amplifier with a wide frequency range, for example for video-signals, in which the collector of a first transistor is connected to the supply via the series connection of a resistor and an inductance and the signals produced via this series arrangement are supplied to the base of a second transistor. The signals in the upper part of the frequency band are favoured by the self-inductance, so that the influence of internal cross capacitances, such as, for example, wiring capacitances and natural capacitances of transistors respectively, can be compensated for.

The object of the present invention is to supply an amplifier with which a predetermined frequency characteristic can be achieved in a widest possible frequency range. A particular object is to supply a simple re-adjustment to compensate for the influence of the internal capacitances of a circuit element connected in the signal source, for example a camera tube. The amplifier according to the invention is characterized in that the resistor forms part of a potentiometer connected in series with the self-inductance between supply and base of the second transistor, and the collector of the first transistor is connected to a variable tapping of this potentiometer.

In order that the invention may be readily carried into effect, it will now be described in greater detail, by way of example, with reference to the accompanying drawing.

The FIGURE shows a signal source 1 which may comprise, for example, a camera tube (vidicon) with a succeeding amplifier, and which is followed by a transistor amplifier 2. The source 1 has a frequency characteristic which, at comparatively low frequencies, shows a real negative pole. In order to obtain a highest possible signal-to-noise ratio, the camera tube is provided with an output resistor of the highest possible value forming this pole with the internal capacitances.

According to the invention, the collector of the transistor 2 is connected to a variable tapping 3 of a potentiometer 4 which is connected in series with a self-inductance 5 between supply and base of a second transistor amplifier 6. The capacitor 7 only operates as a separating capacitor and the resistor 8 serves to adjust the base bias current of the transistor 6. The amplified signals are derived from the output resistor 9.

The achievement of a wideband frequency characteristic, the two conjugate complex poles of which are substantially independent of the position of the variable tapping 3, is rendered possible by the series connection 4, 5 together with the internal impedance of the input of the transistor 6. By displacing this tapping 3, the part of the frequency characteristic corresponding to these poles is not influenced. The upper part *4a* of the potentiometer 4, however, together with the self-inductance 5, produces a real negative zero point by means of which the pole of the signal source 1 can be compensated for. By suitable choice of the above complex poles, a flat total frequency characteristic in a wide frequency range is obtainable which, when exchanging the camera tube, may be re-adjusted in a simple manner by adjusting the tapping 3. If by exchanging the camera tube, a change of the position of the pole of the supply 1 occurs in the supply 1, a corresponding change of the zero point of the series connection *4a*—5 is rendered possible by re-adjusting the tapping 3 of the potentiometer 4, without influencing the flat frequency characteristic which is obtained by suitable proportioning of the series connection of the potentiometer 4 and the self-inductance 5 together with the input impedance of the transistor 6.

In a practical example, the following circuit elements were used: Transistors 2 and 6: OC 171; resistors 4, 8, 9, 10 and 11 of 300Ω, 47 KΩ, 15 KΩ, 20Ω and 1 KΩ; part of the resistor *4a*: approximately 60Ω; self-inductance 5 of 4.5 μh.; capacitors 7 and 12 each of 50 μf.; supply voltage of 10 v.; the pole of the source 1 to be compensated for lay approximately at 2 mc./s., the band-width of the total amplifier amounted to 10 mc./s.

What is claimed is:

1. A wide band transistor amplifier comprising first and second transistors, a source of signals, means applying said signals to the base of said first transistor, a source of operating potential, a series circuit comprising an inductance, a resistor, and a capacitor serially connected in that order between said source of operating potential and the base of said second transistor, said resistor having a variable tap, and means connecting the collector of said first transistor to said variable tap.

2. A wide band transistor amplifier comprising first and second transistors, a source of signals, a source of operating voltage having first and second terminals means applying said signals between the base of said first transistor and said first terminal, resistor means connecting the emitter of said first transistor to said first terminal, a series circuit comprising an inductor, a resistor and a capacitor connected in that order between said second terminal and the base of said second transistor, a variable tap on said resistor, means connecting said tap to the collector of said first transistor, and means connected to said second terminal and the base of said second transistor to provide base bias for said second transistor.

3. A wide band transistor amplifier comprising first and second transistors, a source of signals, means applying said signals to the base of said first transistor, a source of operating voltage, a series circuit of an inductor and resistor, the inductor end of said series circuit being connected to said source of operating voltage, means connecting the resistor end of said series circuit to the base of said second transistor, said resistor having a variable tap, and means connecting said tap to the collector of said first transistor.

References Cited in the file of this patent

UNITED STATES PATENTS

| | | |
|---|---|---|
| 2,058,883 | Ives et al. | Oct. 27, 1936 |
| 2,155,467 | Braden | Apr. 25, 1939 |